US011385105B2

(12) United States Patent
De Muynck (10) Patent No.: US 11,385,105 B2
(45) Date of Patent: Jul. 12, 2022

(54) TECHNIQUES FOR DETERMINING EMITTED RADIATION INTENSITY (71) Applicant: FLIR Systems, Inc., Wilsonville, OR (US)

(72) Inventor: Steffen De Muynck, Wevelgem (BE)

(73) Assignee: Teledyne FLIR, LLC, Thousand Oaks, CA (US)

( * ) Notice: Subject to any disclaimer, the term of this patent is extended or adjusted under 35 U.S.C. 154(b) by 684 days.

(21) Appl. No.: 15/478,054

(22) Filed: Apr. 3, 2017

(65) Prior Publication Data

US 2017/0287164 A1    Oct. 5, 2017

Related U.S. Application Data

(60) Provisional application No. 62/318,099, filed on Apr. 4, 2016.

(51) Int. Cl.
    *G01J 5/10*        (2006.01)
    *G06T 3/20*        (2006.01)
    *G06T 5/00*        (2006.01)
    *G01J 5/02*        (2022.01)
    (Continued)

(52) U.S. Cl.
    CPC .............. *G01J 5/10* (2013.01); *G01J 5/0275* (2013.01); *G01J 5/0295* (2013.01); *G01J 5/07* (2022.01); *G06T 3/20* (2013.01); *G06T 5/008* (2013.01); *G01J 2005/0077* (2013.01); *G06T 2207/10048* (2013.01)

(58) Field of Classification Search
    None
    See application file for complete search history.

(56) References Cited

U.S. PATENT DOCUMENTS

| 5,517,575 | A | * | 5/1996 | Ladewski | .............. | G01B 11/24 356/394 |
| 6,023,061 | A |   | 2/2000 | Bodkin |   |   |
| 7,133,570 | B1 |  | 11/2006 | Schreier et al. |  |  |

(Continued)

FOREIGN PATENT DOCUMENTS

EP    2757768    7/2014

OTHER PUBLICATIONS

"Inverse-square law", Wikipedia, modified on Mar. 30, 2016, at 16:08, 7 pages [online], [retrieved on Sep. 26, 2019]. Retrieved from the Internet: <URL:https://en.wikipedia.org/wiki/Inverse-square_law> (Year: 2016).*

(Continued)

*Primary Examiner* — Chikaodili E Anyikire
(74) *Attorney, Agent, or Firm* — Haynes and Boone, LLP (57)    ABSTRACT

Systems and methods according to one or more embodiments are provided for determining an emitted radiation intensity of an object in a thermal image. In one example, a system includes a memory component configured to store a plurality of captured thermal images of a scene and a processor. The processor is configured to select a pixel on a thermal image corresponding to a measured radiation intensity associated with an object in the scene. Real world coordinates of the object are determined. An emitted radiation intensity of the object is calculated using the determined real world coordinates and the measured radiation intensity. Additional systems and methods are also provided.

18 Claims, 9 Drawing Sheets

(51) Int. Cl.
*G01J 5/07* (2022.01)
*G01J 5/00* (2022.01)

(56) References Cited

U.S. PATENT DOCUMENTS

| | | | |
|---|---|---|---|
| 8,619,144 B1 | 12/2013 | Chang et al. | |
| 8,786,707 B1 | 7/2014 | Ettinger | |
| 2010/0013615 A1* | 1/2010 | Hebert | B60Q 9/006 340/425.5 |
| 2010/0238291 A1 | 9/2010 | Pavlov et al. | |
| 2011/0199489 A1 | 8/2011 | Fischer et al. | |
| 2013/0191014 A1* | 7/2013 | Dalal | G08G 1/052 701/119 |
| 2013/0322697 A1* | 12/2013 | Grindstaff | G06T 7/246 382/107 |
| 2014/0028842 A1 | 1/2014 | Abramson et al. | |
| 2014/0362230 A1 | 12/2014 | Bulan et al. | |
| 2016/0012593 A1* | 1/2016 | Chao | G06K 9/4604 382/209 |
| 2018/0114438 A1* | 4/2018 | Rajagopalan | G08G 1/147 |

OTHER PUBLICATIONS

"5.2.2.3. Thermography camera calibration with reference radiator", COLOSS honey bee research association, 2 pages [online], [retrieved on Apr. 21, 2016]. Retrieved from the Internet: <URL:http://www.coloss.org/beebook/l/physiology/5/2/2/3>.

"Vi-System User's Guide Version 4.2", Comprehensive Video Analytics Solutions, Feb. 2013, 8 pages, section 2.4, Agent, Tel Aviv District, IL. <URL:https://agentvi-web-site.s3.amazonaws.com/Agent%20Vi%20Website/2%20-%20Resources%20-%20Technical%20Documents/Current%20Versions/Vi-System%20User's%20Guide%20v4.2.pdf>.

"Inverse-square law", Wikipedia, modified on Aug. 24, 2015, 6 pages, [online], [retrieved on Apr. 6, 2017], Retrieved from the Internet: <URL:https://en.wikipedia.org/wiki/Inverse-square_law>.

"The Pinhole Camera/Camera Calibration/3D Depth Estimation/Homography", University of California Irvine, updated on Feb. 18, 2015, 6 pages [online], [retrieved on Apr. 6, 2017]. Retrieved from the Internet: <URL:http://www.ics.uci.edu/~majumder/vispercep/cameracalib.pdf>.

* cited by examiner

TECHNIQUES FOR DETERMINING EMITTED RADIATION INTENSITY

CROSS-REFERENCE TO RELATED APPLICATIONS

This patent application claims the benefit of U.S. Provisional Patent Application No. 62/318,099 filed on Apr. 4, 2016 which is hereby incorporated by reference in its entirety.

TECHNICAL FIELD

The present invention relates generally to thermal image processing and, more particularly, to determining emitted radiation intensity of objects in thermal images.

BACKGROUND

In the field of thermal imaging, there is often a difference between the actual emitted radiation intensity of an object and the measured radiation intensity received by a thermal imager. This difference is typically caused by attenuation of the emitted radiation over distance. Various techniques have been developed to compensate for such attenuation, but with limited success.

In some cases, the distance between the thermal imager and the imaged object may be measured directly using, for example, a laser or radar device. Unfortunately, such distance measurement techniques typically require additional equipment and may be cumbersome to implement. In other cases, the thermal imager may be configured to assume a preset distance (e.g., approximately three meters) and compensate based on that distance. However, such present techniques have limited applicability and may still provide inaccurate information for objects at distances greater or lesser than the preset distance. Moreover, such techniques may not be suited for objects that are moving either toward or away from the imaging camera, and may only be applicable to motionless scenes.

SUMMARY

Systems and methods are disclosed herein in accordance with one or more embodiments that provide an improved approach to compensate for a reduction in measured radiation intensity of a thermal image caused by radiation attenuation over a distance from an image capture component to the object being imaged.

In one embodiment, a method includes capturing a thermal image of a scene by an image capture component; selecting a pixel of the thermal image, wherein the pixel has a value corresponding to a measured radiation intensity associated with an object in the scene; determining real world coordinates of the object; and calculating an emitted radiation intensity of the object using the determined real world coordinates and the measured radiation intensity.

In another embodiment, a system includes a memory component configured to store a plurality of captured thermal images of a scene by an image capture component; a processor configured to: select a pixel of the thermal image, wherein the pixel has a value corresponding to a measured radiation intensity associated with an object in the scene; determine real world coordinates of the object; and calculate an emitted radiation intensity of the object using the determined real world coordinates and the measured radiation intensity.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to compensate for reductions in measured radiation intensities on captured thermal images. An emitted radiation intensity of an object may be attenuated on a captured thermal image by, for example, atmospheric absorption of radiation intensity. Measured radiation intensity of the object may thus be reduced as a function of the distance between the image capture component and the object being imaged. In this regard, the measured radiation intensity of an object on a captured thermal image may vary as the object travels either toward or away from the image capture component.

In various embodiments, one or more thermal images of an object may be captured by an image capture component. A pixel location of the object may be identified on an image plane of the captured image. Real world coordinates of the object may be determined from the pixel location on the image plane. A distance from the image capture component to the object may be determined using the determined real world coordinates. An emitted radiation intensity of the object may be determined using the measured radiation intensity and the distance.

In some embodiments, real world coordinates of the object may be determined using camera parameters to translate the pixel location of the object on an image plane to real world coordinates. In some embodiments, real world coordinates may be determined using the measured radiation intensity value, and an angle defined by the image capture component and the selected pixel locations on the image plane.

In various embodiments, the processing techniques described herein may be advantageously used to compensate for a reduction in measured radiation intensity at distances greater than attenuation compensation capabilities of conventional imaging cameras. For example, in various embodiments disclosed herein, additional equipment is not required to determine a distance of an object beyond the capability of a conventional imaging camera. Additionally, manual entry of camera parameters is not required, reducing the possibility of human error. Utilizing pixel information inherent in a thermal image and camera parameters easily accessed from the imaging camera provides for effective and robust thermal radiation distance attenuation compensation.

Figure 1:
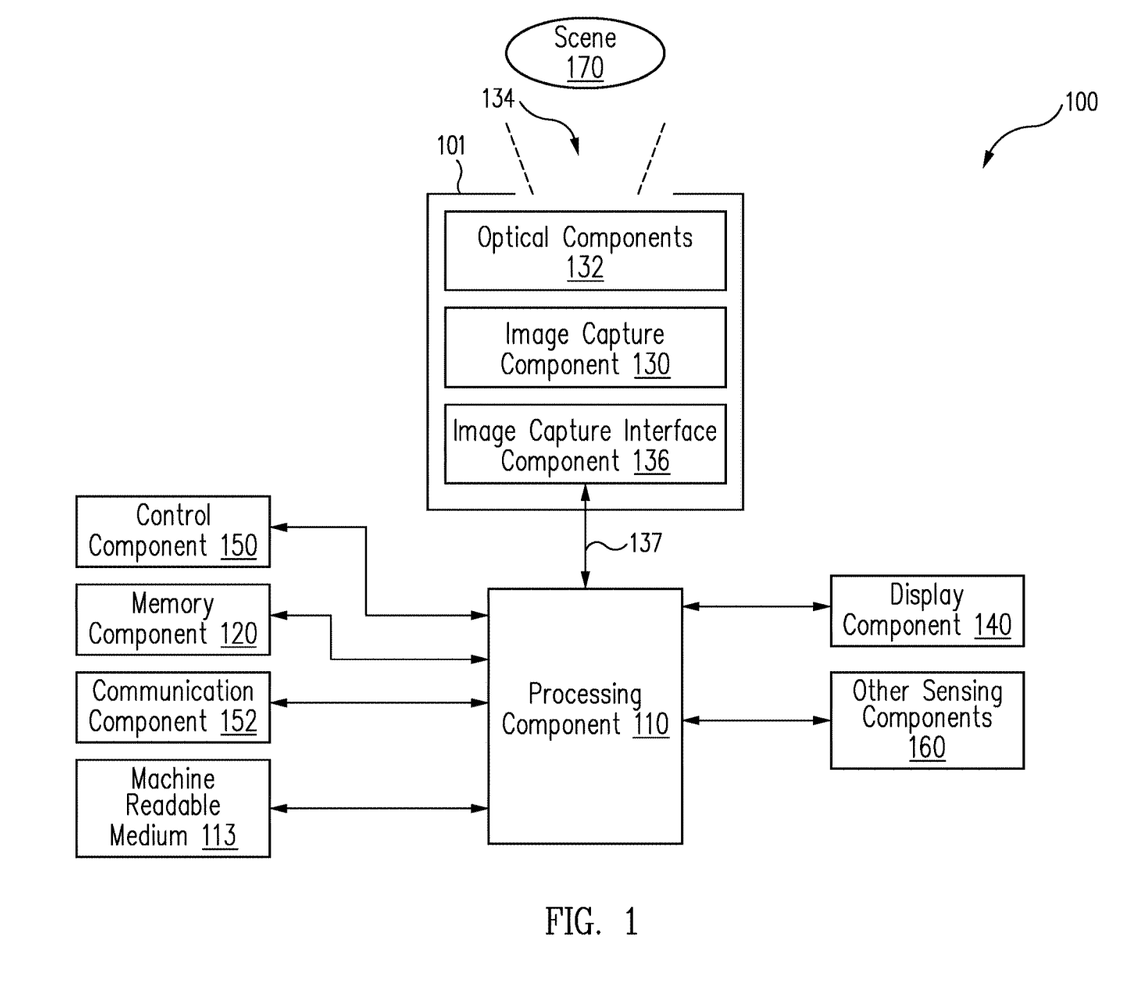
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a camera component 101, such as an imaging camera. In another embodiment, one or more components of imaging system 100 may be implemented remotely from each other in a distributed fashion (e.g., networked or otherwise).

In various embodiments, imaging system 100 provides a capability to determine real world coordinates of a selected object within a scene 170. For example, imaging system 100 may be configured to capture one or more images of scene 170 using camera component 101 (e.g., a thermal imaging camera). Captured images may be received by a processing component 110 and stored in a memory component 120. Processing component 110 may be configured to select a pixel associated with the object within an array of unit cells (e.g., such as unit cell array 232 of FIG. 2) of an image capture component 130. Processing component 110 may be configured to determine a measured radiation intensity value of the pixel associated with the object. Processing component 110 may determine real world coordinates of the object from the location of the pixel on an image plane. Processing component 110 may be configured to determine imaging system 100 parameters such as focal length of image capture component 130, size of image capture component 130 unit cells (e.g., unit cells 232 of FIG. 2), and resolution of image capture component 130.

In one embodiment, imaging system 100 includes processing component 110, a memory component 120, image capture component 130, optical components 132 (e.g., one or more lenses configured to receive electromagnetic radiation through an aperture 134 in camera component 101 and pass the electromagnetic radiation to image capture component 130), an image capture interface component 136, a display component 140, a control component 150, a communication component 152, and other sensing components 160.

In various embodiments, imaging system 100 may be implemented as an imaging camera, such as camera component 101, to capture image frames, for example, of scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., thermal radiation) and provides representative data (e.g., one or more still image frames or video image frames). For example, imaging system 100 may represent a camera component 101 that is directed to detect visible light and/or infrared radiation and provide associated image data.

Imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive thermal images of scene 170.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is adapted to interface and communicate with components 120, 130, 140, 150, and 160 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various image frames of scene 170.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine readable medium 113 to perform various methods, processes, and operations in a manner as described herein.

Image capture component 130 includes, in one embodiment, one or more sensors (e.g., any type visible light, infrared, or other type of detector) for capturing image signals representative of an image of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. In various aspects, processing component 110 may be remotely positioned, and processing component 110 may be adapted to remotely receive image signals from image capture component 130 via wired or wireless communication with image capture interface component 136, as described herein. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a tablet, a laptop computer, a desktop computer, or other type of device.

Processing component 110 may be adapted to communicate with image capture interface component 136 (e.g., by receiving data and information from image capture component 130). Image capture interface component 136 may be configured to receive image signals (e.g., image frames) from image capture component 130 and communicate image signals to processing component 110 directly or through one or more wired or wireless communication components (e.g., represented by connection 137) in the manner of communication component 152 further described herein. Camera component 101 and processing component 110 may be positioned proximate to or remote from each other in various embodiments.

In another embodiment, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In one embodiment, communication component 152 may be implemented as a network interface component (NIC) adapted for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
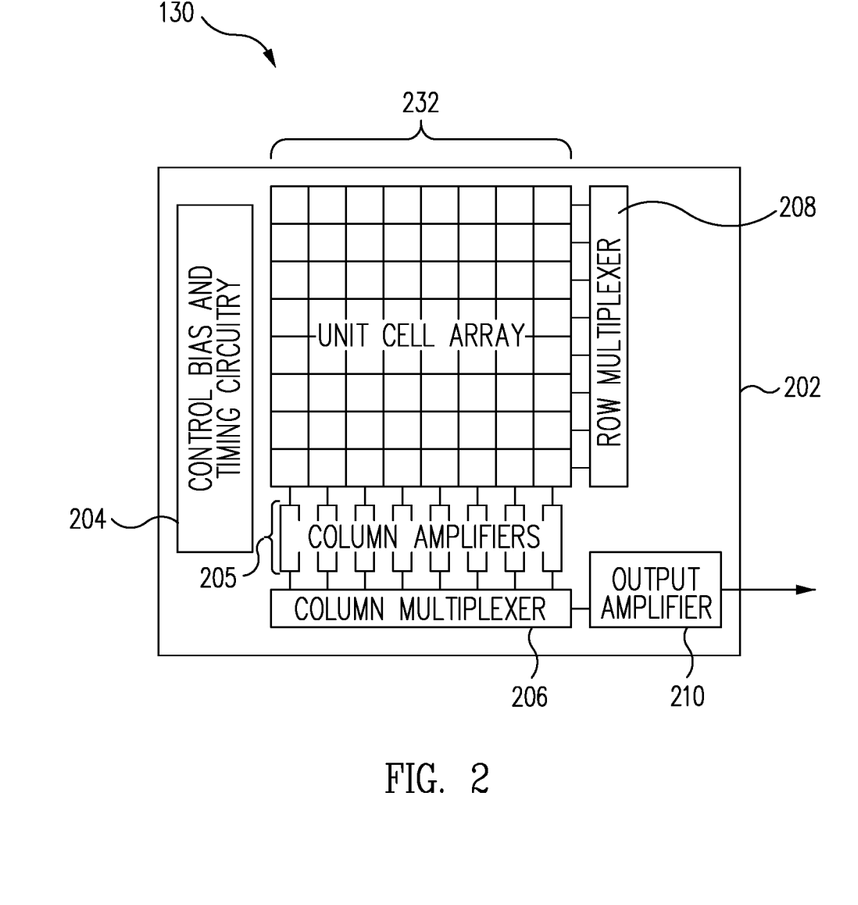
FIG. 2 illustrates a block diagram of an image capture component in accordance with an embodiment of the disclosure.

FIG. 2 illustrates a block diagram of an image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
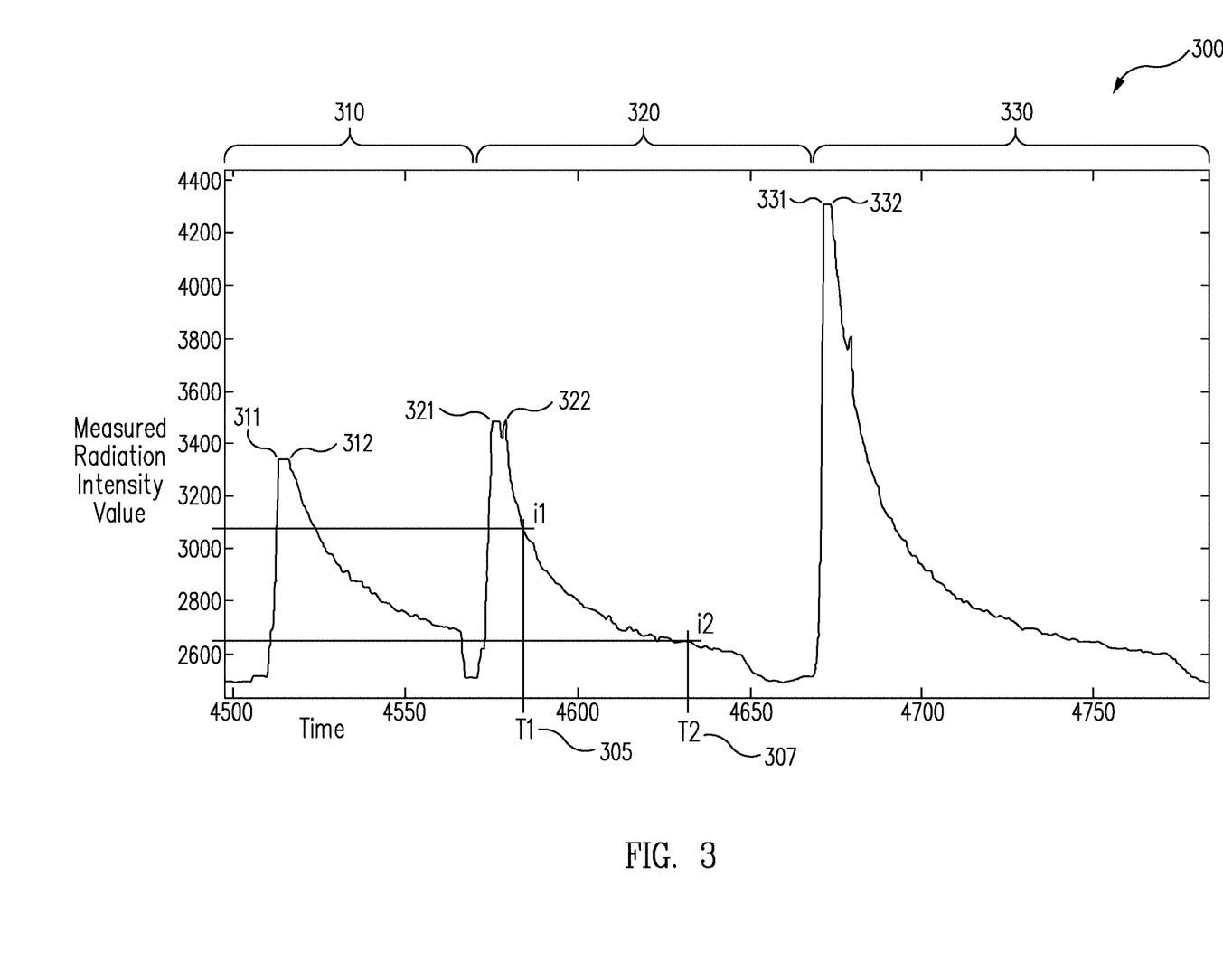
FIG. 3 illustrates a plot of measured radiation intensity of several moving objects in accordance with an embodiment of the disclosure.

FIG. 3 illustrates a plot 300 of measured radiation intensity of several moving objects in accordance with an embodiment of the disclosure. In particular, plot 300 includes three time periods, 310, 320, and 330, where each time period is associated with a different moving object, such as a moving vehicle travelling through a scene 170 of a roadway. In this illustration, camera component 101 of imaging system 100 may be mounted to a stationary fixture along the roadway within scene 170. Camera component 101 may capture successive thermal images of scene 170 using image capture component 130. Processing component 110 may process the successive thermal images and select a pixel from each captured thermal image having the highest measured radiation intensity associated with the moving vehicle. Furthermore, the selected pixel within the thermal image may be different (e.g., such as a different location on the thermal image and/or a different intensity value) for each captured thermal image. Thus, each time period 310, 320, and 330 includes a plot of pixel values corresponding to the highest measured radiation intensity for the various thermal images captured over the corresponding time period.

As discussed, plot 300 is associated with several moving vehicles, each of which provides a source of emitted radiation. In this regard, each vehicle is associated with a respective time period 310, 320, or 330 and provides a source of emitted radiation intensity that is substantially constant over the respective time period, such as an exhaust pipe emitting substantially constant thermal radiation. Plot 300 shows that individual plots of selected pixel values within each time period have similar curvature features. Generally, for each time period 310, 320, and 330, measured radiation intensity values are highest, as shown on plot 300 of FIG. 3 from point 311 to 312, 321 to 322, and 331 to 332, when the respective moving vehicle is closest to camera component 101. Furthermore, each of the measured radiation intensities decrease as the vehicle travels away from camera component 101, as shown on plot 300 from point 312 to the end of time period 310, point 322 to the end of time period 320, and point 332 to the end of time period 330.

Plots 310, 320, and 330 each show that measured radiation intensity captured on a thermal image changes in intensity magnitude as the substantially constant emitted radiation source travels away from and/or toward an image capture component 130. Thus, there is a desire to compensate the measured radiation intensity on a thermal image due to attenuation of the emitted radiation intensity as an object travels a distance from camera component 101.

Referring again to FIG. 3, time period 320 includes a measured radiation intensity value corresponding to a pixel i1 selected from a thermal image captured at time 305 (e.g., T1). Plot 320 also includes a measured radiation intensity value corresponding to a pixel i2 selected from a thermal image captured at time 307 (e.g., T2). Pixel i1 and pixel i2 may be at different locations on their respective thermal images (e.g., as shown by locations 404a and 406a on an image plane 402 of FIG. 4). Pixel it and/or pixel i2 projected onto an image plane may be used in determination of real world coordinates associated with an object (e.g., such as the source of emitted radiation intensity of moving vehicles of plot 300), as described herein. Furthermore, measured radiation intensity values of pixels i1 and/or i2 may be used in determining the emitted radiation intensity of the object to aid in compensating for distance attenuation of thermal radiation, as described herein.

Figure 4:
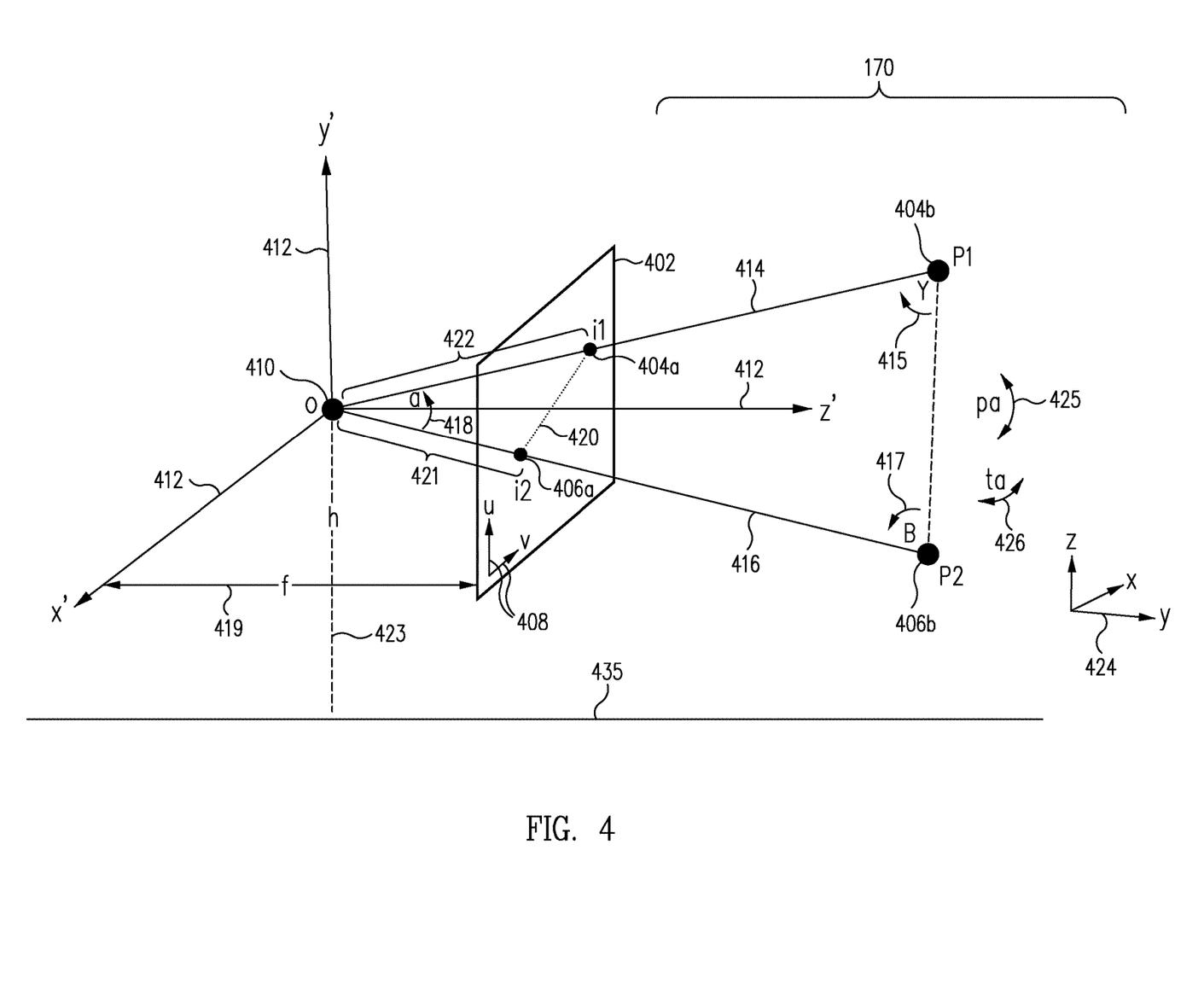
FIG. 4 illustrates a diagram showing relationships between several measured radiation intensity values of FIG. 3 and real world locations in accordance with an embodiment of the disclosure.

FIG. 4 illustrates a diagram showing relationships between several measured radiation intensity values of FIG. 3 and real world locations in accordance with an embodiment of the disclosure. As shown in FIG. 4, pixels i1 and pixel i2 on image plane 402 correspond to real world points 404b (e.g., P1) and 406b (e.g., P2), respectively. FIG. 4 shows an image plane coordinate system 408 (e.g., u,v), a camera coordinate system 412 (e.g., x', y', z'), and a real world coordinate system 424 (e.g., X, Y, Z). Processes and methods described herein may be used to make a translation from locations 404a and 406a of image plane coordinate system 408 to locations 404b and 406b of real world coordinate system 424. Processing component 110 may determine real world coordinates for points 404b (P1) and 406b (P2) from image plane 402 locations 404a of pixel i1 and 406a of pixel i2. The real world coordinates for points 404b and/or 406b may be used to determine the emitted radiation intensity at the thermal radiation source of the object corresponding to points 404b and/or 406b.

In one embodiment, an emitted radiation intensity of a thermal radiation source may be determined using equation 1A. Equation 1A provides that the measured radiation intensity (I) is inversely proportional to the square of a distance (D) to the emitted radiation intensity (R) of a radiation source.

$$I = \frac{R}{4\pi * D^2} \quad \text{(equation 1A)}$$

For example, in equation 1A, I may be the measured radiation intensity of pixels i1 and/or i2, and R may be the emitted radiation intensity of the radiation source (e.g., one of the moving vehicles of FIG. 3).

Although equation 1A will be further discussed herein, the inverse square relationship between measured radiation intensity I distance D identified in equation 1A is particularly suited for lens-less systems wherein there are no lenses (e.g., optical elements) or other atmospheric factors intervening between image plane 402 and points 404b and 404b discussed herein.

In other embodiments where the effects of atmospheric factors are present, the following equation 1B may be used:

$$I = R * e^{\alpha * D} \quad \text{(equation 1B)}$$

For example, in equation 1B, $\alpha$ may be an extinction coefficient associated with attenuation due to atmospheric factors (e.g., temperature, humidity, particulate, and/or other factors). Where appropriate, additional adjustments may be made to further account for changes in intensity associated with one or more optical elements disposed in front of image plane 402 (e.g., whether factored into extinction coefficient $\alpha$ or otherwise).

In some embodiments, processing component 110 may calculate extinction coefficient $\alpha$ based on, for example, temperature measurements, humidity measurements, and/or other measurements received from one or more sensing components 160. In some embodiments, such measurements may be provided by remote systems (e.g., networked or otherwise) to imaging system 100 (e.g., where imaging system 100 is implemented as part of a networked traffic camera system).

Referring again to equation 1A, by substituting the measured radiation intensity value of pixel i1 and the measured radiation intensity value of pixel i2 for I, and the distance 414 from point (P1) 404b to a camera origin (O) 410 (e.g., D(P1, O)) and the distance 416 from point (P2) 406b to camera origin (O) 410 (e.g., D(P2, O)) for D, equation 1A may be re-written in the form of equations 2 and 3.

$$i1 = \frac{R}{4\pi * D(P1, O)^2} \quad \text{(equation 2)}$$

$$i2 = \frac{R}{4\pi * D(P2, O)^2} \quad \text{(equation 3)}$$

Equations 2 and 3 may be re-ordered into the form of equation 4 by assuming the emitted radiation intensity (R) of the moving object remains substantially constant. Furthermore, the term $4\pi$ is a constant value and may be ignored for this re-ordering.

$$i1(D(P1, O))^2 = i2(D(P2, O))^2 \quad \text{(equation 4)}$$

Rearranging equation 4 forms the following equation 5.

$$\sqrt{\frac{i1}{i2}} = \frac{d(P2, O)}{d(P1, O)} \quad \text{(equation 5)}$$

Referring to FIG. 4 and applying the sine rule of triangles provides, length 416 (e.g., D(P2, O)) divided by sine of angle 415 (Y) is equal to length 414 (e.g., D(P1, O)) divided by sine of angle 417 (B). Equation 5 may be rewritten in the form of equation 6 using substitution based on the sine rule.

$$\sqrt{\frac{i1}{i2}} = \frac{\sin(Y)}{\sin(B)} \quad \text{(equation 6)}$$

Equation 6 may be rewritten in the form of equation 7 by substituting angle (Y) with (180-a-B) (e.g., using the principle that the sum of angles of a triangle equals one hundred-eighty degrees).

$$\sqrt{\frac{i1}{i2}} = \frac{\sin(180 - a - B)}{\sin(B)} \quad \text{(equation 7)}$$

Referring to FIG. 4, angle (a) 418 may be calculated using camera parameter focal length (f) 419, length 421 (e.g., from camera origin 410 to point i2), and length 422 (e.g., from camera origin 410 to point i1). Lengths 419, 421, and 422 may be determined using camera parameters. Angle (a) 418 may be determined from lengths 419, 421, and 422 using triangle equations. Angle (a) 418 may be substituted in equation 7 to determine angle (B) 417. Angle (Y) 415 may be calculated using equation 6 by substituting known angle (B). Distances 414 and 416 may be determined using triangle equations. Furthermore, determined distances 414 (e.g., D(P1, O)) and 416 (e.g., D(P2, O)) may be used to calculate an emitted radiation intensity of the thermal radiation source of moving object of FIG. 3 using equations 2 and 3, respectively.

In some embodiments, a speed of the moving object may be calculated using real world coordinates from two time identified (e.g., time stamped) thermal images. In this regard, processing component 110 may be adapted to determine real world coordinates of points 404b and 406b, as described herein. Processing component 110 may be adapted to subtract real world coordinates of 404b from real world coordinates of 406b to determine a distance traveled by the moving object relative to fixed camera origin 410 (e.g., camera origin 410 of image capture component 130). Processing component 110 may be further adapted to determine a time of thermal image captured at time T1 (e.g., a first time) and a time of thermal image captured at time T2 (e.g., a second time). Processing component 110 may be adapted to calculate an elapsed time by subtraction of the first time from the second time. Speed of the moving object may be calculated by dividing the distance traveled by the elapsed time.

In another embodiment, real world coordinates of point 404b and/or point 406b may be determined using the relational formula of equation 8.

$$s \begin{bmatrix} u \\ v \\ 1 \end{bmatrix} \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(equation 8)}$$

Equation 8 describes the relation between the real world points 404b or 406b captured by camera component 101 and their respective equivalent points i1 or i2 at image plane 402 of camera component 101.

Equation 8 may be re-written in the form of equation 9.

$$x = C*T*P \quad \text{(equation 9)}$$

where, for example, x is the homogenous coordinates of pixel i1

$$s \begin{bmatrix} u \\ v \\ 1 \end{bmatrix},$$

C is a camera matrix $$\begin{bmatrix} f_x & 0 & c_x \\ 0 & f_y & c_y \\ 0 & 0 & 1 \end{bmatrix},$$

T is a transformation matrix $$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix},$$

and P is the homogenous coordinates of point P1 (404b)

$$\begin{bmatrix} X \\ Y \\ Z \\ 1 \end{bmatrix}.$$

Matrices C and T of Equation 8 may be determined using camera parameters of camera component 101. For example, camera matrix C (e.g., intrinsic camera parameters) includes terms fx and fy. Terms fx and fy are focal length (e.g., focal length (f) 419 of camera component 101) multiplied by a resolution of camera component 101 (e.g., resolution of unit cells 232), where resolution is expressed in pixels per unit length. Terms cx and cy of camera matrix C are offset (e.g., offset of the origin 410 of the image capture component) multiplied by the resolution of camera component 101.

Transformation matrix T may include parameters (e.g., extrinsic camera parameters) such as height (h) 423 of camera component 101 from a surface 435, pan angle (pa) 425 of camera component 101, and tilt angle (ta) 426 of camera component 101. Parameters of transformation matrix T depend on installation specific camera parameters. For example, in a stationary installation, camera height (h) 423 may be measured once, by a laser and/or any appropriate distance measuring device and stored in memory component 120 and/or provided to processing component 110. Height 423 measurement may be used for one or more transformation matrices. Pan angle 425 and tilt angle 426 may be measured with an external instrument such as a gyroscope and stored in memory component 120 and/or provided to processing component 110. However, in some embodiments, pan angle 425 and/or tilt angle 426 may be altered and/or updated to capture one or more perspectives of scene 170. Thus, there is a desire to efficiently and reliably accommodate updated pan 425 and tilt 426 terms in transformation matrix T. In some embodiments, a vanishing point may be used to determine pan angle 425 and tilt angle 426, as described herein. Processing component 110 may receive camera parameters via image capture interface component 136 and/or communication component 152 to integrate within equation 8. Processing component 110 may store received camera parameters in memory component 120.

Real world coordinates of points 404b and/or 406b may be determined using the relational formula of equation 8 after camera and transformation matrices are completed. Lengths 414 (e.g., D(P1, O)) and 416 (e.g., D(P2, O)) may be determined from real world coordinates of points 404b and/or 406b. Furthermore, determined length 414 and measured radiation intensity of pixel i1 may be used to calculate an emitted radiation intensity of the thermal radiation source of FIG. 3 using equation 2. Determined length 416 (e.g., D(P2, O)) and measured radiation intensity value of pixel i2 may be used to calculate an emitted radiation intensity of the thermal radiation source of FIG. 3 using equation 3. It will be appreciated that in various embodiments as described herein, real world coordinates may be determined from at least one or more thermal images of a moving object and/or using intrinsic and extrinsic camera parameters readily available to a user.

Figure 5:
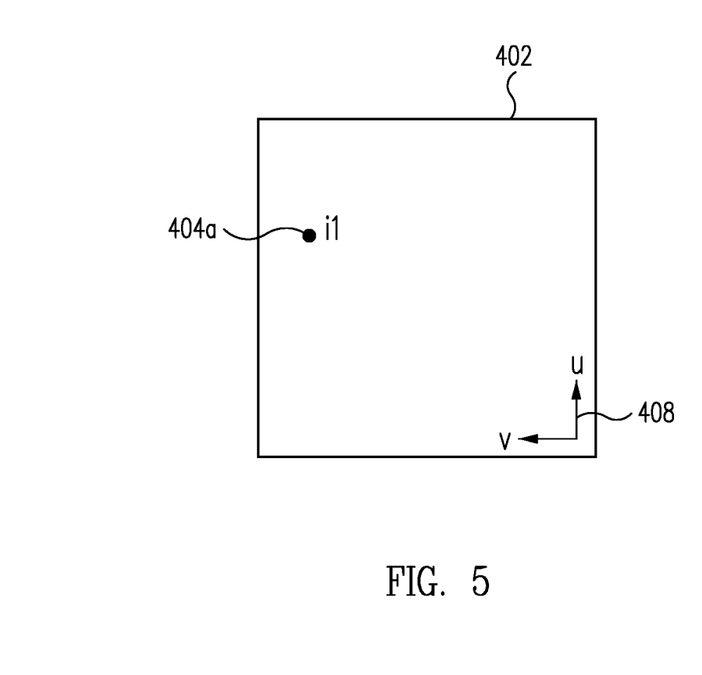
FIGS. 5 and 6 illustrate locations of pixels on an image plane corresponding to the measured radiation intensity values of FIG. 4 in accordance with embodiments of the disclosure.
Figure 6:
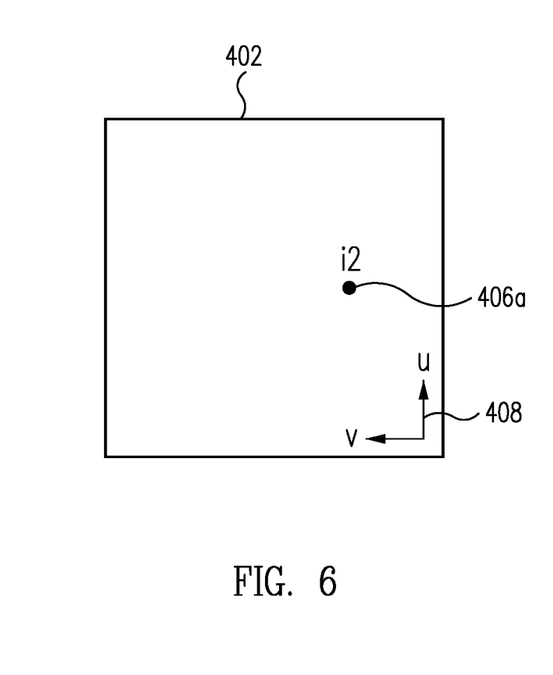

FIGS. 5 and 6 illustrate locations of pixels (e.g., 404a of pixel i1 and 406a of pixel i2) on an image plane 402 corresponding to measured radiation intensity values of pixel i1 and pixel i2 of FIG. 4 in accordance with embodiments of the disclosure. Real world points 404b (P1) and 406b (P2) are projected onto image plane 402 at locations 404a and 406a, respectively. As shown in FIGS. 5 and 6, image plane 402 includes image plane coordinate system 408. Locations 404a of pixel i1 and 406a of pixel i2 may be used to determine real world coordinates of points 404b and 406b, as described herein.

Figure 7A:
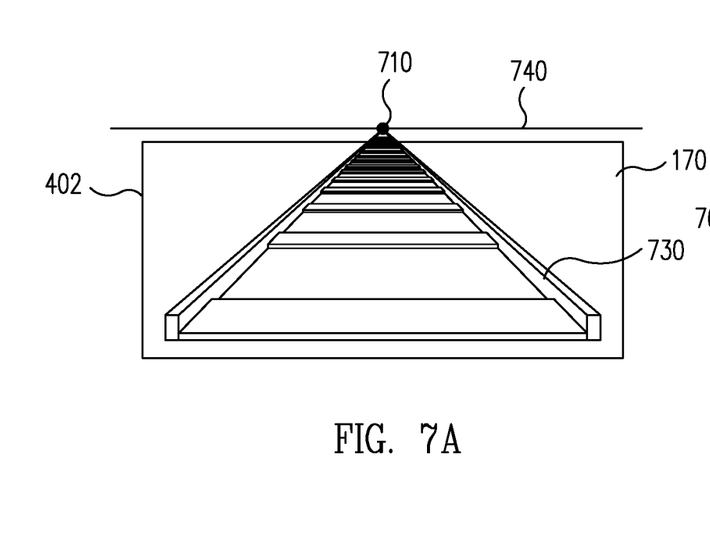
FIGS. 7A and 7B illustrate examples of using vanishing points to determine camera parameters in accordance with embodiments of the disclosure.
Figure 7B:
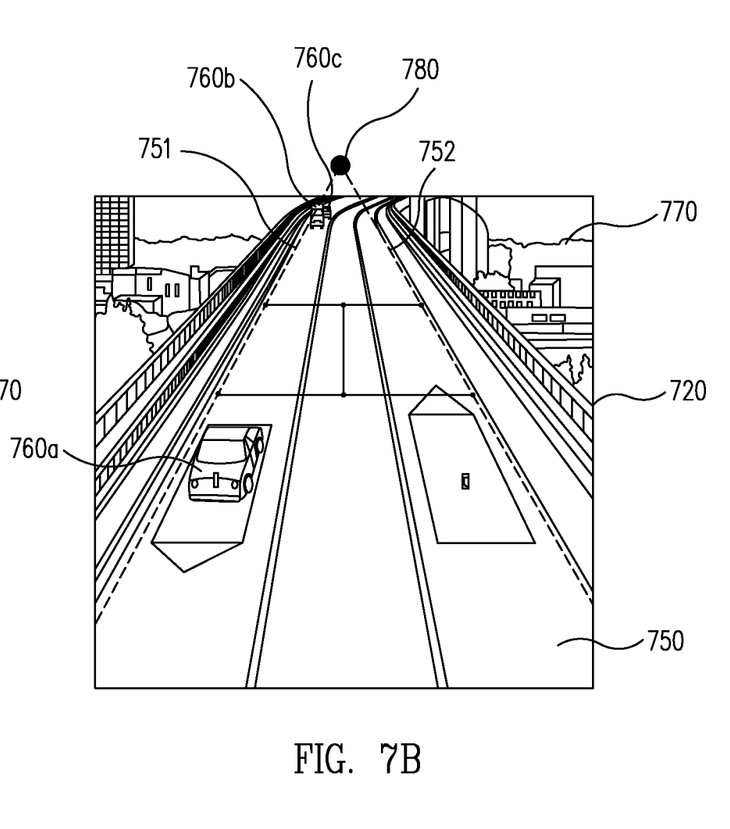

FIGS. 7A and 7B illustrate examples of using vanishing points (e.g., 710 and 780) to determine camera parameters in accordance with embodiments of the disclosure. As described herein, the camera matrix C and transformation matrix T of equation 8 may be used to determine real world coordinates of points 404b and 406b. Camera matrix C may be determined using intrinsic camera parameters focal length 419, resolution, and camera origin offset, as described herein. In some embodiments, intrinsic parameters are constant and may be retrieved from memory component 120 by processing component 110 for use in generating camera matrix C of equation 8. Transformation matrix T may be determined from camera height (h) 423, pan angle (pa) 425, and tilt angle (ta) 426 (e.g., extrinsic parameters), as described herein.

Generally, extrinsic parameters may be application specific (e.g., such as imaging a roadway scene 170, a pedestrian path scene 170, or a railway scene 170 in multiple directions, and/or in multiple perspectives). In some embodiments, camera height (h) 423 may be fixed and determined by an external device, as described herein. However, pan angle (pa) 425, and/or tilt angle (ta) 426 may be adjusted by imaging system 100 in one or more perspective views of scene 170. An external device such as a gyroscope may be used to measure pan angle 425 and/or tilt angle 426. However, as discussed here, external devices may add complexity and may be cumbersome to implement.

As shown in FIG. 7A, in one embodiment, pan angle 425 and/or tilt angle 426 may be determined for camera component 101 using vanishing point 710. Vanishing point 710 is a point at which parallel lines of a captured scene converge on image plane 402. Although vanishing point 710 is not within the four corners of image plane 402, it can be implied. For example, rail tracks 730 run parallel in the real world. Unlike the real world, parallel lines of rail tracks 730 in scene 170 converge on image plane 402 at horizontal line 740 and intersect at point 710 (e.g., vanishing point 710). Vanishing point 710 coordinates on image plane 402 may be used to determine pan angle 425 and/or tilt angle 426 of camera component 101.

FIG. 7B illustrates an example of an image 720 of a scene 770 to determine a vanishing point 780. Scene 770 shows a roadway 750 and cars 760a, 760b, and 760c travelling on roadway 750. Parallel lines 751 and 752 within scene 770 are projected onto image 720. Parallel lines 751 and 752 converge in image 720 and intersect at vanishing point 780 external to image plane 720. Information from vanishing point 780 may be used to determine pan angle 425 and/or tilt angle 426 using processing component 110. In this regard, one or more transformation matrix parameters may be determined using vanishing point 780.

Figure 8:
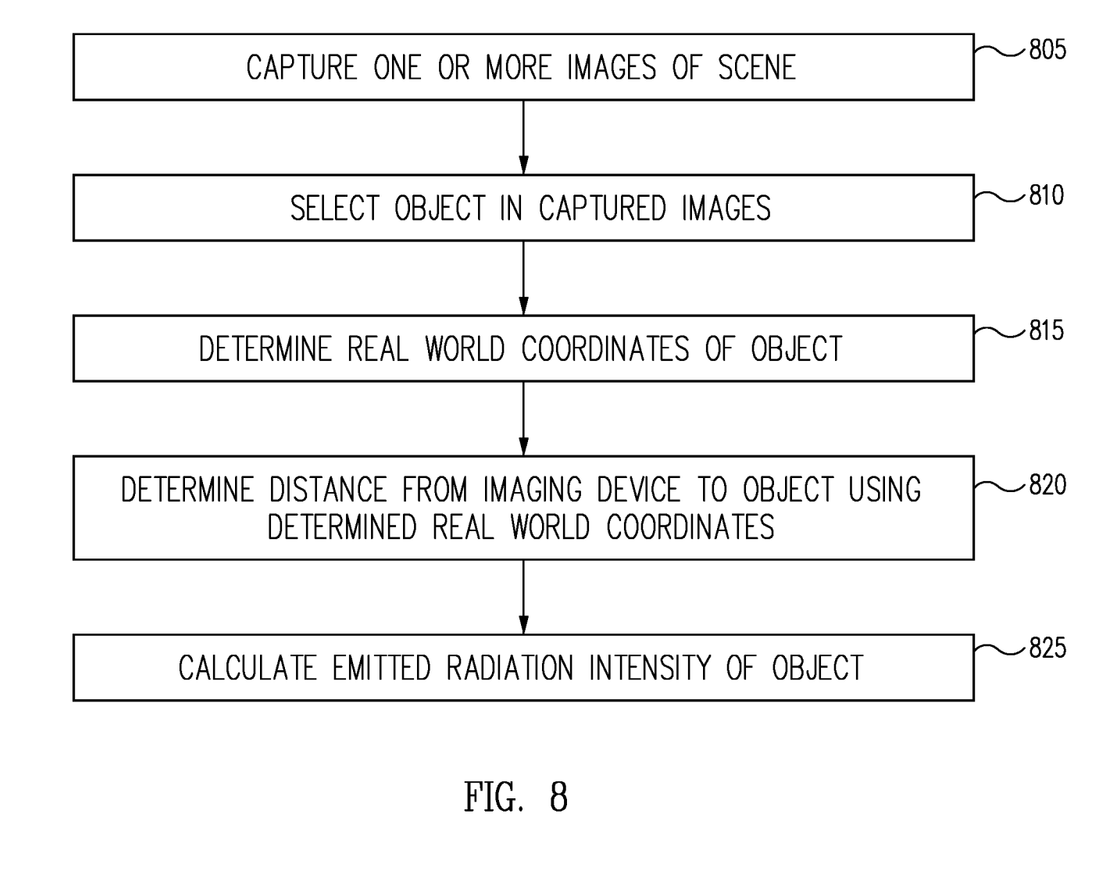
FIG. 8 illustrates a process of determining emitted radiation intensity of a moving object in accordance with an embodiment of the disclosure.

FIG. 8 illustrates a process of determining emitted radiation intensity of a moving object in accordance with an embodiment of the disclosure.

In block 805, image capture component 130 of camera component 101 may be configured to capture one or more successive images of scene 170 and provide captured images to processing component 110. For example, scene 170 may be a roadway scene, a pedestrian path scene, or a railway scene. Camera component 101 of imaging system 100 may be mounted to a pedestal or a stationary fixture. Camera component 101 may be configured to capture images of scene 170 in multiple directions and/or in multiple perspectives. In some embodiments, camera component 101 may be configured to capture one or more successive images of roadway 750.

In block 810, processing component 110 may select an object in scene 170 on one or more captured images. In some embodiments, the object may be a moving vehicle. The moving vehicle may be emitting a substantially constant thermal radiation within scene 170. Processing component 110 may process successive captured images and select a pixel with a corresponding highest measured radiation intensity associated with the moving vehicle from each captured image.

In block 815, processing component 110 may determine real world coordinates of the object associated with the selected pixel. For example, processing component 110 may determine real world coordinates of point 404b and/or point 406b on image plane 402. In one embodiment, real world coordinates of point 404b and/or point 406b may be determined using equation 8, as described herein. In another embodiment, real world coordinates of point 404b and point 406b may be determined using an angle 418 and measured radiation intensities of pixels i1 and pixel i2, and using equations 5, 6 and 7, as described herein.

In block 820, a distance from image capture component 130 to points 404b and/or 406b may be determined using determined real world coordinates of equation 8, and/or equations 4 through 7.

In block 825, emitted radiation intensity of the object may be determined using equation 1A by substituting the distance determined in block 820, and measured radiation intensity of pixel i1 and/or i2.

Figure 9:
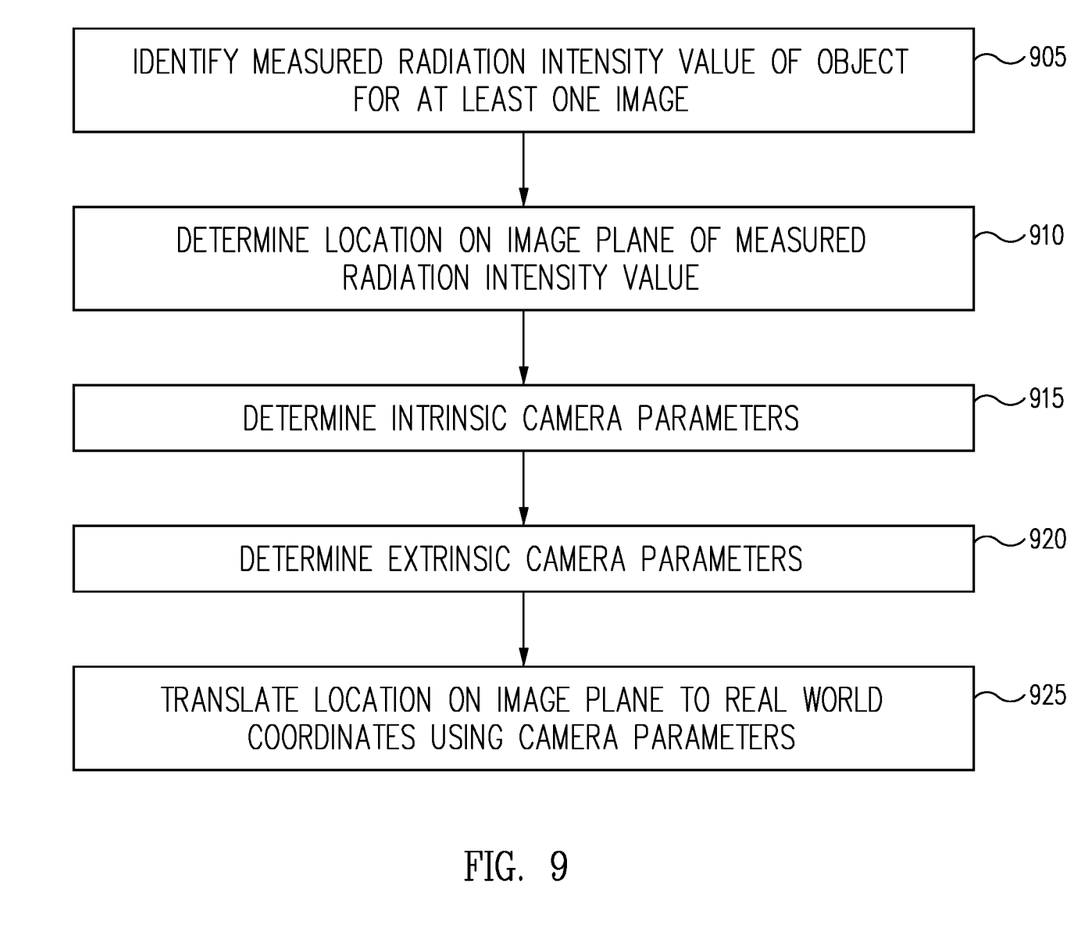
FIG. 9 illustrates a process of determining real world coordinates of a moving object using camera calibration parameters in accordance with an embodiment of the disclosure.

FIG. 9 illustrates a process of determining real world coordinates of a moving object using camera calibration parameters in accordance with an embodiment of the disclosure. As discussed, equation 8 describes the relation between real world coordinates of points 404b and 406b and their respective equivalent image plane 402 locations 404a and 406a.

In block 905, processing component 110 may be configured to identify a highest measured radiation intensity of an object within scene 170 on one or more captured thermal images, such as measured radiation intensity of pixel i1 on a first thermal image and measured radiation intensity of pixel i2 on a second thermal image.

In block 910, processing component 110 may be configured to determine locations on image plane 402 associated with measured radiation intensity values of pixel i1 and/or pixel i2, respectively. Measured radiation intensity of pixel i1 on the first thermal image corresponds to location 404a. Measured radiation intensity of pixel i2 on the second thermal image corresponds with location 406a.

In block 915, processing component 110 may be configured to determine intrinsic camera parameters, such as intrinsic parameters included in the camera matrix C of equation 8. As discussed, in some embodiments, intrinsic camera parameters may include terms fx and fy. Terms fx and fy are focal length multiplied by a resolution of camera component 101, where resolution is expressed in pixels per unit length. Furthermore, terms cx and cy of equation 8 are camera component 101 offset multiplied by a resolution of camera component 101.

In block 920, extrinsic parameters of equation 8 may be determined. As discussed, transformation matrix T of equation 8 includes extrinsic parameters; camera height (h) 423 of camera component 101 from a surface 435, pan angle (pa) 425, and tilt angle (ta) 426. A vanishing point (e.g., vanishing point 710) on image plane 402 may be used to determine extrinsic parameters pan angle 425 and tilt angle 426, as described herein.

In block 925, completed camera matrix C and transformation matrix T may be used in equation 8 to translate locations 404a and/or 406a on image plane 402 to real world coordinates of points 404b and/or 406b, respectively.

Figure 10:
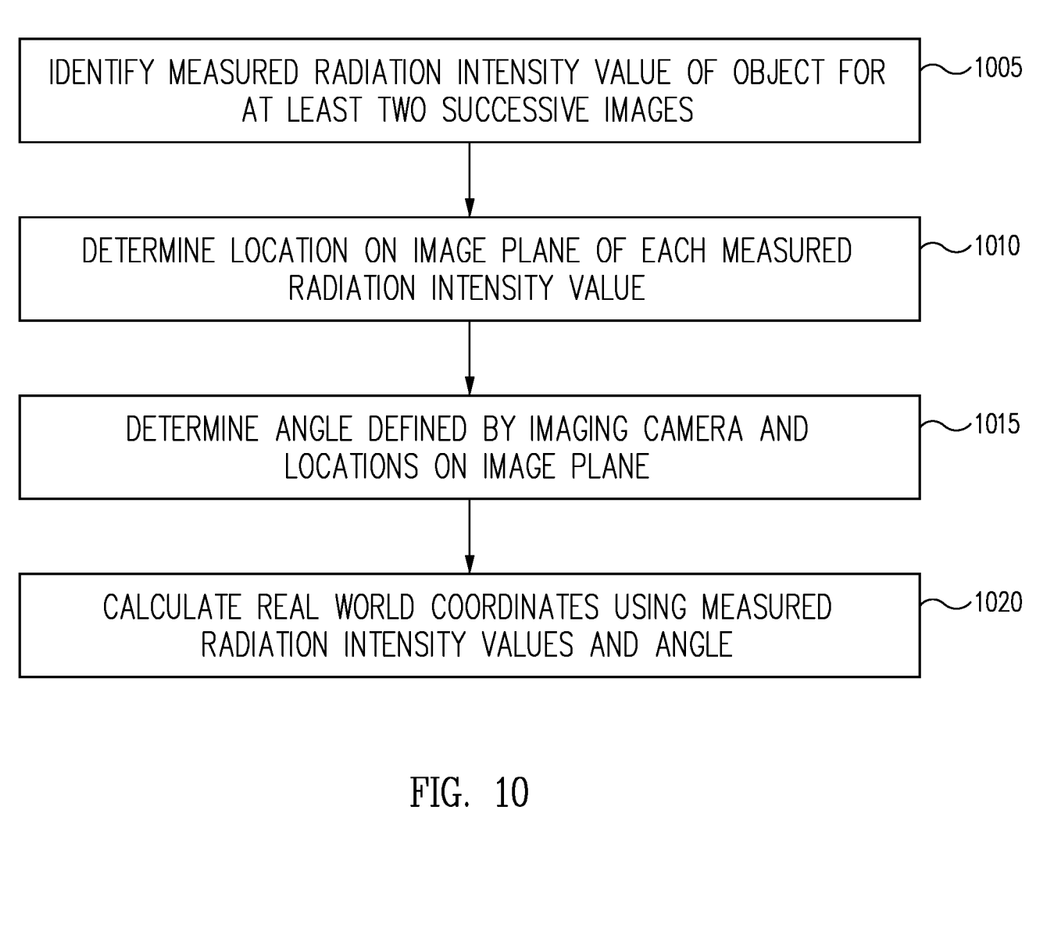
FIG. 10 illustrates a process of determining real world coordinates of a moving object using measured radiation intensity values in accordance with an embodiment of the disclosure.

FIG. 10 illustrates a process of determining real world coordinates of a moving object using measured radiation intensity values (e.g., such as measured radiation intensity values of i1 and/or i2) in accordance with an embodiment of the disclosure.

In block 1005, processing component 110 may be configured to identify a highest measured radiation intensity of an object within scene 170 on at least two successive captured thermal images, such as measured radiation intensity of i1 on a first thermal image and measured radiation intensity of i2 on a second thermal image.

In block 1010, processing component 110 may be configured to determine locations 404a and 406a corresponding to pixels i1 and i2, respectively, on image plane 402.

In block 1015, processing component 110 may be configured to determine an angle (a) 418 defined by the camera origin 410 and the image plane 402 locations 404a of pixels i1 and 406a of pixel i2.

In block 1020, real world coordinates of points 404b and 406b corresponding to locations 404a and 406a on image plane 402, respectively, may be determined using measured radiation intensity values of pixel i1 and pixel i2, and determined angle (a) 418 in equations 4 through 7, as described herein.

In view of the present disclosure, it will be appreciated that determining an actual emitted radiation intensity of an object on a thermal image using an imaging camera implemented in accordance with various embodiments set forth herein may provide for an automated and reliable method of determining a distance attenuation of thermal radiation. In this regard, by selecting an object within a scene 170, identifying highest measured radiation intensity associated with the object, locating pixels of the measured radiation intensity on an image plane, determining real world coordinates of the object, and using vanishing points for determining camera parameters, thermal radiation distance attenuation may be determined efficiently and effectively.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    capturing first and second thermal images of a scene by an image capture component;
    selecting a first pixel of the first thermal image and a second pixel of the second thermal image, wherein the first and second pixels have values corresponding to first and second measured thermal radiation intensity values associated with an object in the scene;
    determining coordinates of the object in the scene by:
        determining a first location of the selected first pixel and a different second location of the selected second pixel, the first location and the different second location on an image plane associated with the image capture component,
        determining an angle defined by the image capture component and the first location of the selected first pixel and the different second location of the selected second pixel, and
        determining the coordinates of the object corresponding to the first and second pixels using the first and second measured thermal radiation intensity values and the angle; and
    calculating an emitted thermal radiation intensity of the object using the determined coordinates and the first and second measured thermal radiation intensity values to compensate for attenuation associated with transmission of the emitted thermal radiation from the scene to the image capture component.

2. The method of claim 1, further comprising:
    determining a distance from the image capture component to the object using the determined coordinates; and
    wherein the calculating comprises determining the emitted thermal radiation intensity using the distance and the first and second measured thermal radiation intensity values.

3. The method of claim 1, wherein the determining coordinates comprises:
    translating the image plane location to the coordinates using parameters associated with the image capture component.

4. The method of claim 3, wherein the parameters are extrinsic parameters comprising:
    a height of the image capture component;
    a pan angle of the image capture component; and/or
    a tilt angle of the image capture component.

5. The method of claim 4, further comprising determining the pan angle and the tilt angle using a vanishing point on the captured thermal image.

6. The method of claim 3, wherein the parameters are intrinsic parameters comprising:
    a focal length of the image capture component;
    a resolution of the image capture component; and/or
    an offset of the image capture component.

7. The method of claim 6, wherein the focal length is constant.

8. The method of claim 1, wherein the first thermal image is captured at a first time with first coordinates of the object in the scene at the first time,
    wherein the second thermal image is captured at a different second time with second coordinates of the object in the scene at the different second time, and wherein the method further comprises:
    determining a speed of the object using the first and second coordinates and the first and different second times.

9. The method of claim 1, wherein the emitted thermal radiation intensity of the object is substantially constant.

10. A system comprising:
    a memory component configured to store first and second thermal images of a scene by an image capture component;
    a processor configured to:
        select a first pixel of the first thermal image and a second pixel of the second thermal image, wherein the first and second pixels have values corresponding to first and second measured thermal radiation intensity values associated with an object in the scene;
        determine coordinates of the object in the scene by:
            determining a first location of the selected first pixel and a different second location of the selected second pixel, the first location and the different second location on an image plane associated with the image capture component,
            determining an angle defined by the image capture component and the first location of the selected first pixel and the different second location of the selected second pixel, and
            determining the coordinates of the object corresponding to the first and second pixels using the first and second measured thermal radiation intensity values and the angle; and
        calculate an emitted thermal radiation intensity of the object using the determined coordinates and the first and second measured thermal radiation intensity values to compensate for attenuation associated with transmission of the emitted thermal radiation from the scene to the image capture component.

11. The system of claim 10, wherein the processor is further configured to:
   determine a distance from the image capture component to the object using the determined coordinates; and
   determine the emitted thermal radiation intensity using the distance and the first and second measured thermal radiation intensity values.

12. The system of claim 10, wherein the processor is further configured to:
   translate the image plane location to the coordinates using parameters associated with the image capture component.

13. The system of claim 12, wherein the parameters are extrinsic parameters comprising:
   a height of the image capture component;
   a pan angle of the image capture component; and/or a tilt angle of the image capture component.

14. The system of claim 13, wherein the pan angle and the tilt angle are determined using a vanishing point on the captured thermal image.

15. The system of claim 12, wherein the parameters are intrinsic parameters comprising:
   a focal length of the image capture component;
   a resolution of the image capture component; and/or
   an offset of the image capture component.

16. The system of claim 15, wherein the focal length is constant.

17. The system of claim 10, wherein the first thermal image is captured at a first time with first coordinates of the object in the scene at the first time, wherein the second thermal image of the scene by the image capture component is captured at a different second time with second coordinates of the object in the scene at the different second time, and wherein the processor is further configured to:
   determine a speed of the object using the first and second coordinates and the first and different second times.

18. The system of claim 10, wherein the emitted thermal radiation intensity of the object is substantially constant.

* * * * *

UNITED STATES PATENT AND TRADEMARK OFFICE
CERTIFICATE OF CORRECTION

| | |
|---|---|
| PATENT NO. | : 11,385,105 B2 |
| APPLICATION NO. | : 15/478054 |
| DATED | : July 12, 2022 |
| INVENTOR(S) | : Steffen De Muynck |

It is certified that error appears in the above-identified patent and that said Letters Patent is hereby corrected as shown below:

In the Specification

In the Detailed Description:

Column 8, Line 49, change "pixels" to --pixel--.

Column 13, Line 55, change "pixels" to --pixel--.

Column 14, Line 56, change "pixels" to --pixel--.

In the Claims

Column 18, Lines 12-14, Claim 17, change "second thermal image of the scene by the image capture component is captured" to --second thermal image is captured--.

Signed and Sealed this
Twentieth Day of September, 2022

*Katherine Kelly Vidal*

Katherine Kelly Vidal
*Director of the United States Patent and Trademark Office*